United States Patent
Inoshita

(10) Patent No.: US 11,887,329 B2
(45) Date of Patent: Jan. 30, 2024

(54) MOVING BODY GUIDANCE APPARATUS, MOVING BODY GUIDANCE METHOD, AND COMPUTER-READABLE RECORDING MEDIUM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 706 days.

(21) Appl. No.: 16/979,296

(22) PCT Filed: Mar. 13, 2018

(86) PCT No.: PCT/JP2018/009828
§ 371 (c)(1),
(2) Date: Sep. 9, 2020

(87) PCT Pub. No.: WO2019/175994
PCT Pub. Date: Sep. 19, 2019

(65) Prior Publication Data
US 2020/0401163 A1  Dec. 24, 2020

(51) Int. Cl.
*B64C 39/02* (2023.01)
*G06T 7/73* (2017.01)
(Continued)

(52) U.S. Cl.
CPC .............. *G06T 7/73* (2017.01); *B64C 39/024* (2013.01); *B64D 47/08* (2013.01); *B64F 1/18* (2013.01);
(Continued)

(58) Field of Classification Search
None
See application file for complete search history.

(56) References Cited

U.S. PATENT DOCUMENTS

2016/0122038 A1* 5/2016 Fleischman ........... B64C 39/024
244/114 R
2017/0017240 A1* 1/2017 Sharma ................ G05D 1/0676
(Continued)

FOREIGN PATENT DOCUMENTS

JP  2007-010335 A  1/2007
JP  2012-071645 A  4/2012
(Continued)

OTHER PUBLICATIONS

Araar, O., Aouf, N. & Vitanov, I. Vision Based Autonomous Landing of Multirotor UAV on Moving Platform. J Intell Robot Syst 85, 369-384 (2016). https://doi.org/10.1007/s10846-016-0399-z. https://link.springer.com/article/10.1007/s10846-016-0399-z (Year: 2016).*
(Continued)

*Primary Examiner* — Jelani A Smith
*Assistant Examiner* — Davin Seol
(74) *Attorney, Agent, or Firm* — Sughrue Mion, PLLC

(57) ABSTRACT

Provided are a moving body guidance apparatus, a moving body guidance method and a computer-readable recording medium that are for accurately guiding a moving body to a target site. The moving body guidance apparatus has a detection unit 2 that detects, from an image 40 captured by an image capturing apparatus 23 mounted on a moving body 20, a target member image 42 captured of an entirety of a target member 30 or a feature member image 43 captured of an entirety or a portion of feature members 31 and 32 forming the target member 30, and a control unit 3 that performs guidance control for moving a set position 41 set with respect to the image 40 and indicating a position of the moving body 20 closer to the target member image 42 or closer to a designated region 44 set based on the feature member image 43.

6 Claims, 10 Drawing Sheets

(51) Int. Cl.
- *G06T 7/70* (2017.01)
- *B64D 47/08* (2006.01)
- *G05D 1/10* (2006.01)
- *G06V 20/10* (2022.01)
- *H04N 23/54* (2023.01)
- *G06V 20/13* (2022.01)
- *G06V 20/17* (2022.01)
- *B64F 1/18* (2006.01)
- *B64U 10/13* (2023.01)
- *B64U 101/30* (2023.01)
- *G06V 10/24* (2022.01)

(52) U.S. Cl.
CPC ............... *G05D 1/101* (2013.01); *G06T 7/70* (2017.01); *G06V 20/10* (2022.01); *G06V 20/13* (2022.01); *G06V 20/17* (2022.01); *H04N 23/54* (2023.01); *B64U 10/13* (2023.01); *B64U 2101/30* (2023.01); *B64U 2201/00* (2023.01); *G06T 2207/30252* (2013.01); *G06V 10/245* (2022.01)

(56) References Cited

U.S. PATENT DOCUMENTS

| | | | |
|---|---|---|---|
| 2017/0225800 A1* | 8/2017 | Holt | G08G 5/0021 |
| 2022/0091618 A1* | 3/2022 | Li | G05D 1/042 |

FOREIGN PATENT DOCUMENTS

| | | |
|---|---|---|
| JP | 2012-232654 A | 11/2012 |
| JP | 2014-089537 A | 5/2014 |
| JP | 2016-524214 A | 8/2016 |

OTHER PUBLICATIONS

Written Opinion dated May 15, 2018, including International Preliminary Report on Patentability cover sheet dated Sep. 15, 2020 from the International Bureau in International Application No. PCT/JP2018/009828.

International Search Report of PCT/JP2018/009828 dated May 15, 2018 [PCT/ISA/210].

* cited by examiner

Fig.7

| FEATURE MEMBER IDENTIFICATION NUMBER | ARRANGEMENT RELATIVE TO DESIGNATED REGION |
|---|---|
| ID1 | ARRANGEMENT OF ID1 |
| ID2 | ARRANGEMENT OF ID2 |
| ID3 | ARRANGEMENT OF ID3 |
| ID4 | ARRANGEMENT OF ID4 |
| ID5 | ARRANGEMENT OF ID5 |
| ID6 | ARRANGEMENT OF ID6 |
| ID7 | ARRANGEMENT OF ID7 |
| ID8 | ARRANGEMENT OF ID8 |
| ID9 | ARRANGEMENT OF ID9 |

MOVING BODY GUIDANCE APPARATUS, MOVING BODY GUIDANCE METHOD, AND COMPUTER-READABLE RECORDING MEDIUM

CROSS REFERENCE TO RELATED APPLICATIONS

This application is a National Stage of International Application No. PCT/JP2018/009828, filed Mar. 13, 2018.

TECHNICAL FIELD

The present invention relates to a moving body guidance apparatus and a moving body guidance method that perform control for guiding a moving body, and further relates to a computer-readable recording medium that includes a program recorded thereon for realizing the apparatus and method.

BACKGROUND ART

Unmanned aircraft can be effectively utilized in disaster and security support and the like, but since there are various flight regulations on unmanned aircraft, securing a landing site is difficult. In particular, securing a landing site for unmanned aircraft is difficult in places such as high-density residential areas.

In recent years, landing of unmanned aircraft automatically at a landing site has been implemented, utilizing GPS (Global Positioning System) or a target installed at the landing site.

As related technology, technologies have been disclosed that involve arranging a target having a required number of light emitting devices that display a pattern at the landing site, computing the positional relationship between the moving body and the target, based on a pattern image of the captured target, and landing the unmanned aircraft at the landing site using the computation result. Refer to Patent Document 1, for example.

LIST OF RELATED ART DOCUMENTS

Patent Document

Patent Document 1: Japanese Patent Laid-Open Publication No. 2012-232654

SUMMARY OF INVENTION

Technical Problems

However, in Patent Document 1, all of the pattern image of the target is used to land the unmanned aircraft at the landing site. Thus, with the technology shown in Patent Document 1, in the case where all of the target is not captured, the positional relationship between the unmanned aircraft and the target cannot be computed, based on the image of the captured target. Accordingly, in such cases, the unmanned aircraft cannot be landed at the landing site.

An example object of the present invention is to provide a moving body guidance apparatus, a moving body guidance method and a computer-readable recording medium including a moving body guidance program recorded thereon that solve the above problems and perform control for accurately guiding a moving body to a target site.

Solution to the Problems

A moving body guidance apparatus according to an example aspect of the present invention includes:
 a detection unit configured to detect, from an image captured by an image capturing apparatus mounted on a moving body, a target member image captured of an entirety of a target member or a feature member image captured of an entirety or a portion of a feature member forming the target member; and
 a control unit configured to perform guidance control for moving a set position set with respect to the image and indicating a position of the moving body closer to the target member image or closer to a designated region set based on the feature member image.

Also, a moving body guidance method according to an example aspect of the present invention includes:
 (A) a step of detecting, from an image captured by an image capturing apparatus mounted on a moving body, a target member image captured of an entirety of a target member or a feature member image captured of an entirety or a portion of a feature member forming the target member; and
 (B) a step of performing guidance control for moving a set position set with respect to the image and indicating a position of the moving body closer to the target member image or closer to a designated region set based on the feature member image.

Furthermore, a computer-readable recording medium according to an example aspect of the present invention includes a moving body guidance program recorded thereon, the program including instructions that cause a computer to carry out:
 (A) a step of detecting, from an image captured by an image capturing apparatus mounted on a moving body, a target member image captured of an entirety of a target member or a feature member image captured of an entirety or a portion of a feature member forming the target member; and
 (B) a step of performing guidance control for moving a set position set with respect to the image and indicating a position of the moving body closer to the target member image or closer to a designated region set based on the feature member image.

Advantageous Effects of the Invention

As described above, according to the present invention, control for accurately guiding a moving body to a target site can be performed.

BRIEF DESCRIPTION OF THE DRAWINGS

FIG. 7 is a diagram showing an example of a data structure of arrangement information.

EXAMPLE EMBODIMENTS

As described above, various flight regulations apply to unmanned aircraft, thus making it is difficult to secure a landing site for unmanned aircraft in places such as high-density residential areas. In view of this, utilization of locations such as the roof of emergency vehicles as a landing site for unmanned aircraft has been proposed. However, even a skilled operator would have difficulty guiding and landing an unmanned aircraft in a small area such as the roof of an emergency vehicle. Thus, a method of performing control for accurately guiding an unmanned aircraft to a small landing site and landing the unmanned aircraft is called for.

Example Embodiment

Hereinafter, a moving body guidance apparatus, a moving body guidance method and a computer-readable recording medium including a moving body guidance program recorded thereon in an example embodiment of the present invention will be described, with reference to FIGS. 1 to 10.

Note that, in the subsequent description of the example embodiment, a method of performing control for accurately guiding an unmanned aircraft to a landing site will be described as an example, but the moving body that is subjected to guidance control is not limited to an unmanned aircraft, and the moving body may be a manned airplane, a submarine or a spacecraft, for example.

[Apparatus Configuration]

Figure 1:
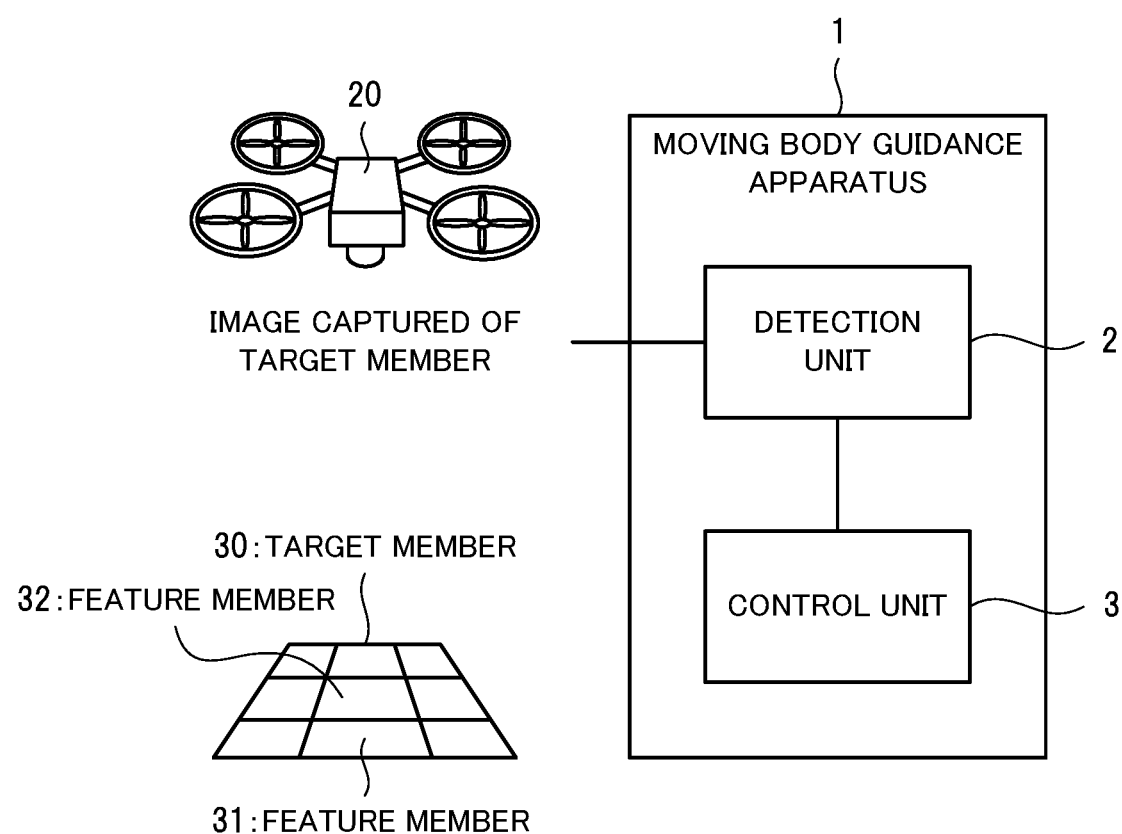
FIG. 1 is a diagram showing an example of a moving body guidance apparatus.
Figure 2:
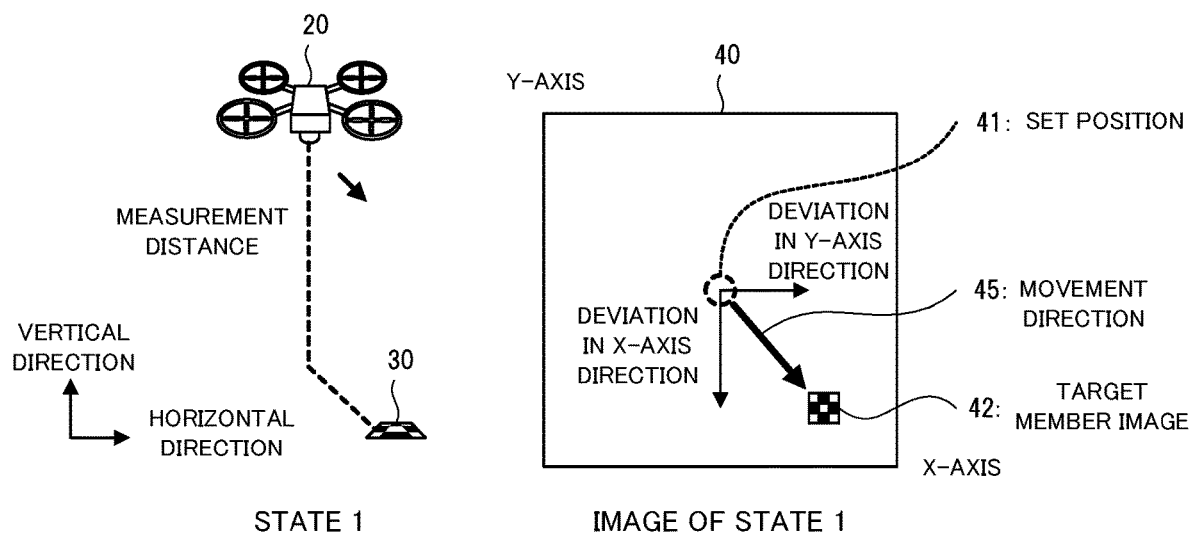
FIG. 2 is a diagram for describing calculation of the movement direction from a set position to a target member image.
Figure 2:
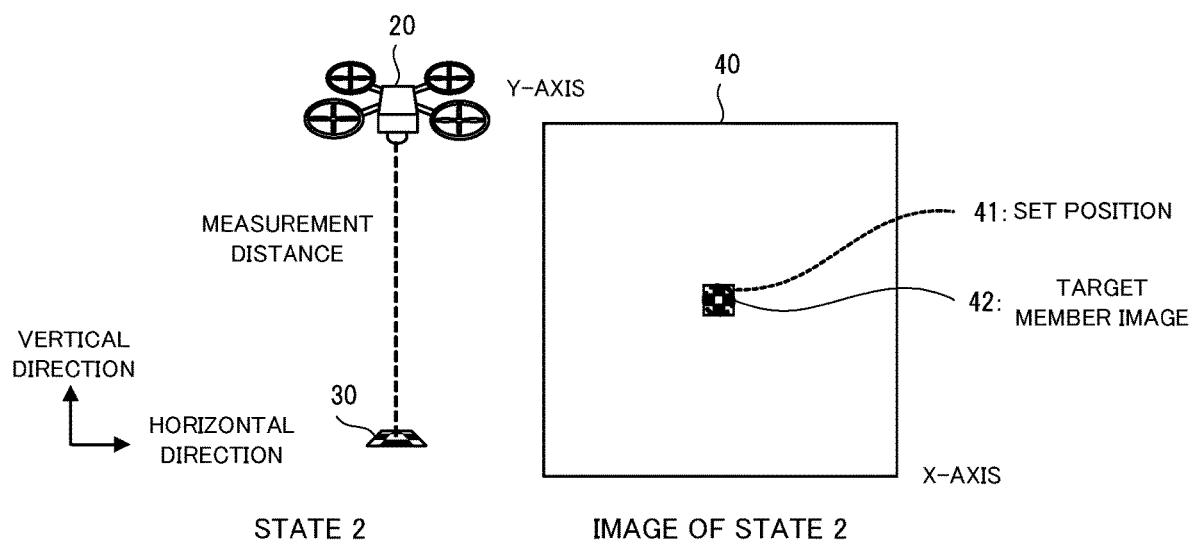
Figure 3:
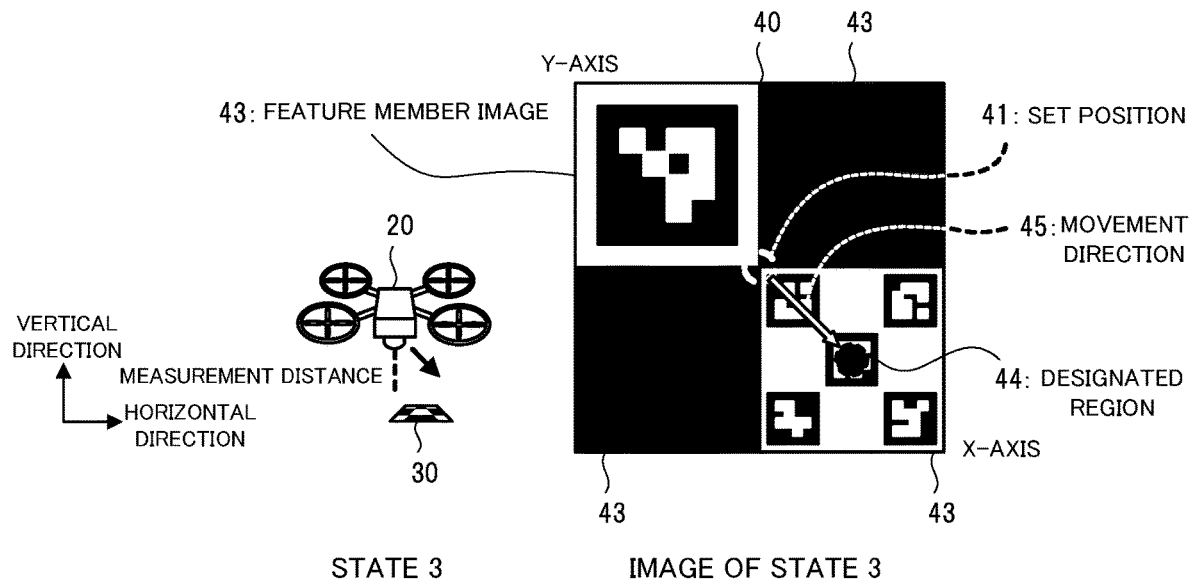
FIG. 3 is a diagram for describing calculation of the movement direction from a set position to a designated region.
Figure 3:
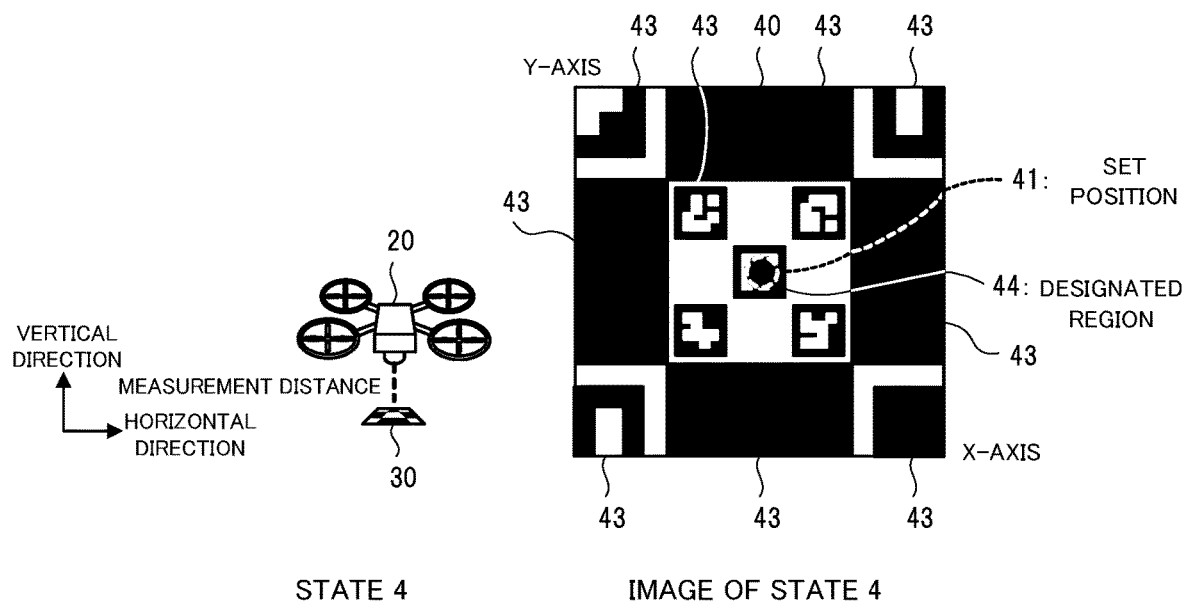

Initially, the configuration of a moving body guidance apparatus in the example embodiment will be described using FIGS. 1, 2 and 3. FIG. 1 is a diagram showing an example of a moving body guidance apparatus 1. FIG. 2 is a diagram for describing calculation of the movement direction from a set position to a target member image. FIG. 3 is a diagram for describing calculation of the movement direction from a set position to a designated region.

The moving body guidance apparatus 1 in the example embodiment shown in FIG. 1 is an apparatus for performing control for accurately guiding a moving body 20 to an arrival site (henceforth, target site), utilizing a target (henceforth, target member) installed at the target site. The moving body guidance apparatus 1 has a detection unit 2 and a control unit 3.

The detection unit 2, as shown in FIG. 2, detects a target member image 42 captured of an entirety of a target member 30 and corresponding to the target member 30, from an image 40 captured by an image capturing apparatus mounted on the moving body 20. The image 40 of a state 1 shown in FIG. 2 is an image captured of the target member 30 by the image capturing apparatus mounted on the moving body 20 in the state 1 shown in FIG. 2.

Or else, the detection unit 2, as shown in FIG. 3, detects a feature member image 43 captured of an entirety or a portion of feature members 31 and 32 forming the target member 30. The image 40 of a state 3 shown in FIG. 3 is an image captured of the target member 30 by the image capturing apparatus mounted on the moving body 20 in the state 3 shown in FIG. 3.

A control unit 3, as shown in FIG. 2, performs control for moving a set position 41 indicating the position of the moving body 20 set with respect to the image 40 closer to the detected target member image 42. Or else, the control unit 3, as shown in FIG. 3, performs control for moving the set position 41 indicating the position of the moving body 20 set with respect to the image 40 closer to a designated region 44 set based on the target member 30.

The set position 41 is set to a place in the image 40 that is captured vertically from the position at which the image capturing apparatus mounted on the moving body 20 is attached. In other words, by setting the set position 41 with respect to the captured image, the control unit 3 is able to recognize the current position of the moving body 20.

In this way, the moving body guidance apparatus 1 in the example embodiment performs control for moving the set position 41 set with respect to the captured image 40 and indicating the position of the moving body 20 closer to the target member image 42 or closer to the designated region 44 set based on the feature member image 43. As a result, the moving body 20 can be accurately guided to the target site where the target member 30 is installed.

Specifically, in the case of moving the set position 41 closer to the target member image 42 as shown in FIG. 2, the moving body guidance apparatus 1 moves the moving body 20 to be vertically above based on the target member 30. As a result, the moving body 20 and the target member 30 will be in a state such as shown in a state 2. Note that the image 40 of the state 2 is an image captured of the target member 30 by the image capturing apparatus mounted on the moving body 20 in the state 2.

Also, in the case of moving the set position 41 closer to the designated region 44 as shown in FIG. 3, the moving body 20 and the target member 30 will be as shown in a state 4, as a result of the moving body guidance apparatus 1 moving the moving body 20 to be vertically above based on the designated region 44, as shown in FIG. 3. Note that the image 40 of the state 4 is an image captured of the target member 30 from the image capturing apparatus mounted on the moving body 20 in the state 4 shown in FIG. 3.

Furthermore, the moving body 20 can be accurately guided to the target site where the target member 30 is installed, by applying the abovementioned control to when shortening the measurement distance between the moving body 20 and the target member 30.

Figure 4:
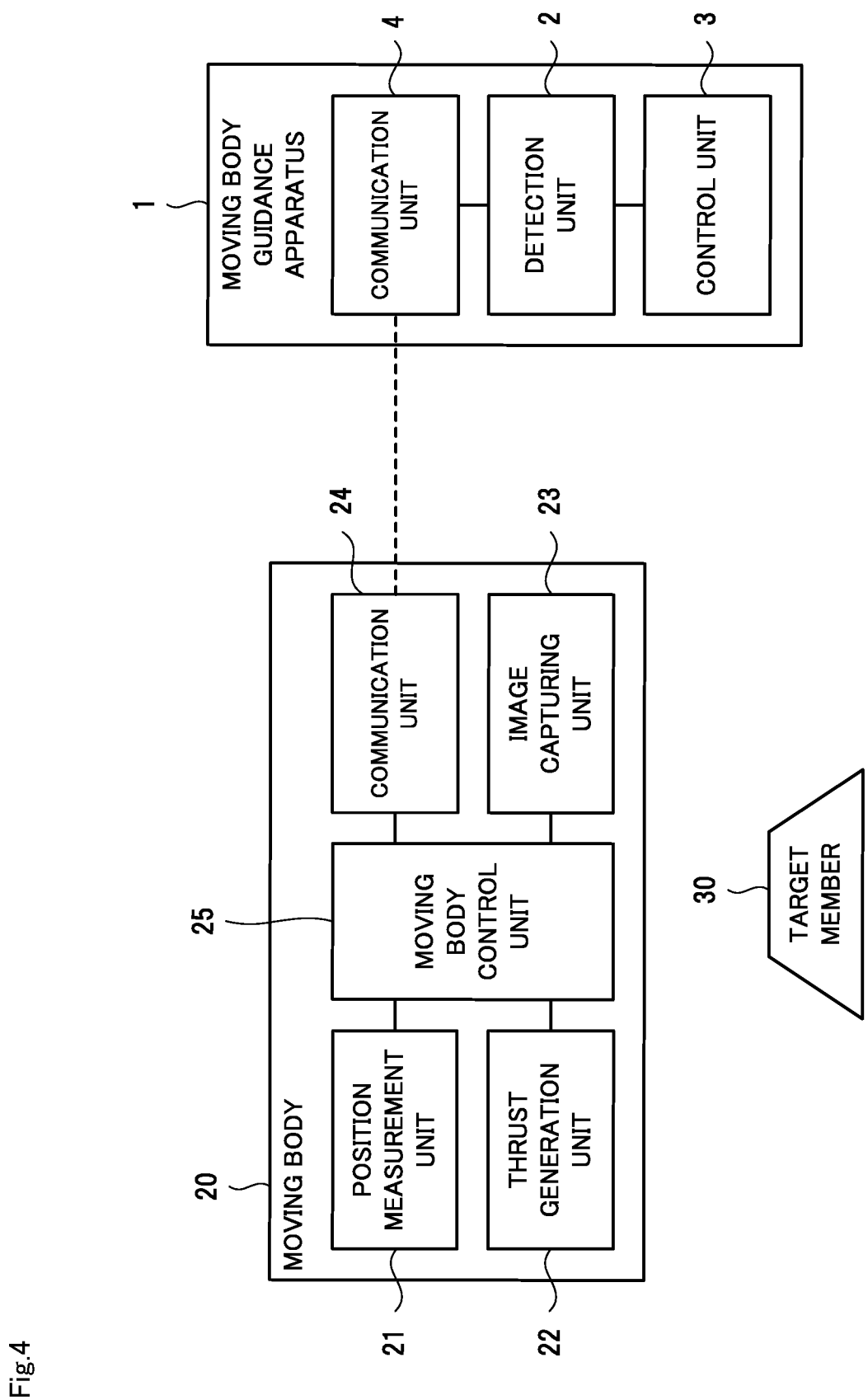
FIG. 4 is a diagram showing an example of a system having a moving body guidance apparatus.
Figure 5:
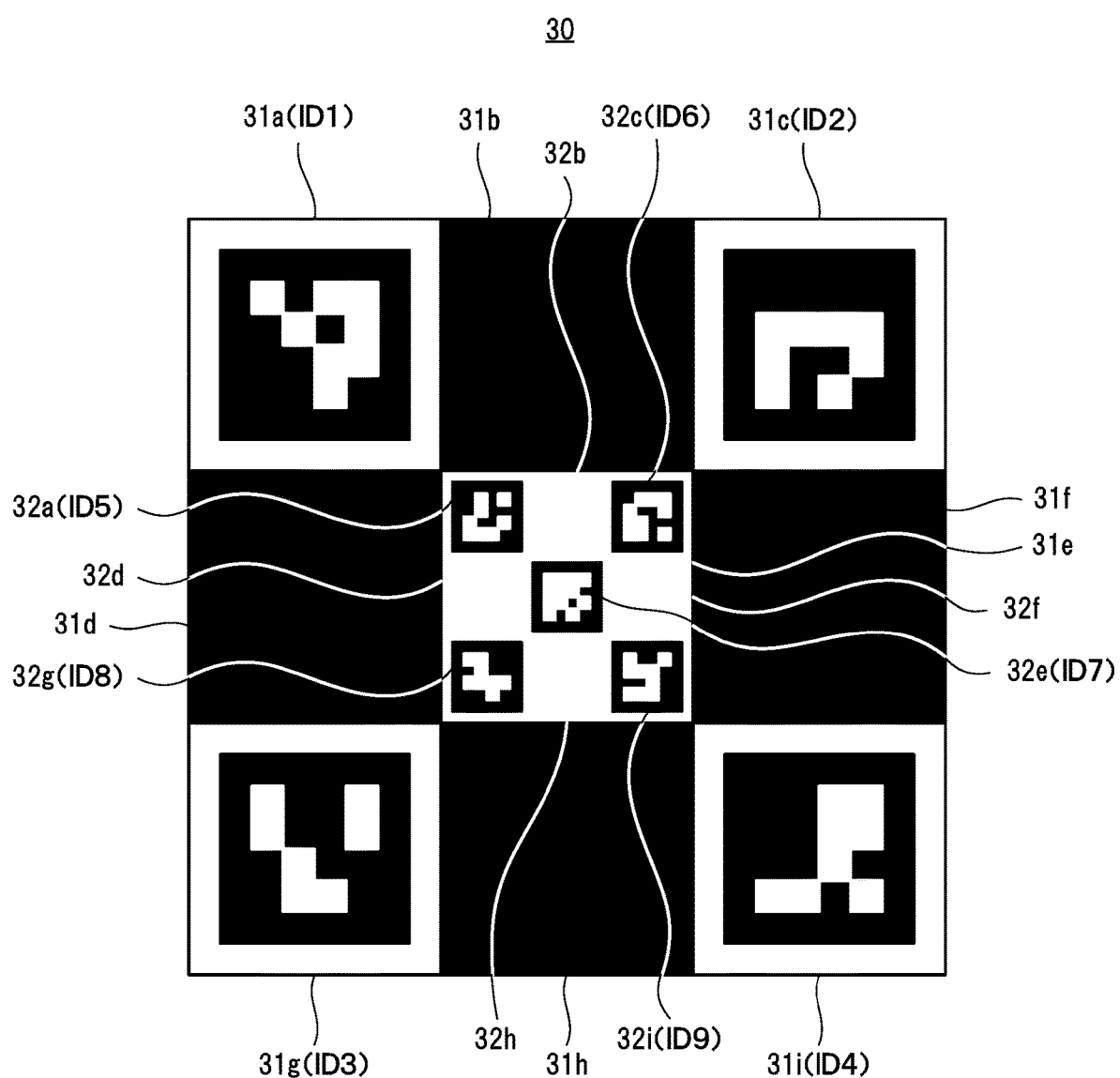
FIG. 5 is a diagram showing an example of a target member.

Next, the moving body guidance apparatus 1, the moving body 20 and the target member 30 in the example embodiment will be specifically described using FIGS. 4 and 5. FIG. 4 is a diagram showing an example of a system having the moving body guidance apparatus. FIG. 5 is a diagram showing an example of the target member. Note that, in the following description, FIGS. 2 and 3 will be taken into consideration as appropriate.

The moving body guidance apparatus 1 will be described.

The moving body guidance apparatus 1, in the example embodiment, is installed outside the moving body 20, and communicates with the moving body 20. Thus, the moving body guidance apparatus 1 has a communication unit 4, in addition to the abovementioned detection unit 2 and control unit 3.

The detection unit 2, first, acquires the image 40 transmitted from the moving body 20 and the measurement distance indicating the distance at which the image 40 was captured. Next, the detection unit 2 refers to preset image detection information, using the acquired image 40 and measurement distance, and detects the target member image 42 that depends on the measurement distance or the feature member image 43 respectively captured of an entirety or a portion of the feature members 31 and 32 forming the target member 30 from the acquired image 40.

Specifically, the detection unit 2 executes pattern matching on the image 40, with a target member image or a feature member image captured in advance every measurement distance, as a template image, and detects the target member image 42 or the feature member image 43 from the acquired image 40.

Image detection information is information that associates the target member image or the feature member image (template image) captured in advance every measurement distance with that measurement distance.

The control unit 3 presets the set position 41 indicating the position of the moving body 20 with respect to the image 40. The set position 41 is, for example, conceivably set to the center or in proximity to the center of the image 40 captured by the moving body 20, as shown in FIGS. 2 and 3. The position where the image capturing apparatus is mounted on the moving body 20 differs, however, depending on factors such as the type of moving body 20, and thus the set position 41 need not necessarily be set to the center of the image.

Next, the control unit 3, in the case where the image 40 captured of an entirety of the target member 30 is acquired, calculates a movement direction 45 for moving the set position 41 closer to the target member image 42, using the set position 41 and the target member image 42, as shown in FIG. 2. The control unit 3 then performs guidance control of the moving body 20, based on the calculated movement direction 45. Calculation of the movement direction 45 shown in FIG. 2 involves calculating the deviations in the X and Y-axis directions, using the coordinates shown by the set position 41 of the image 40 and one of the coordinates included in the region showing the target member image 42, and calculating the movement direction 45 based on the calculation result.

Next, the control unit 3, as shown in FIG. 2, generates control information for guiding the moving body 20 in the direction of the target member image 42 indicated by the movement direction 45, based on the movement direction 45, and outputs the control information to the communication unit 4.

Or else, the control unit 3, in the case where the image 40 respectively captured of an entirety or a portion of the feature members 31 and 32 is acquired, calculates the movement direction 45 for moving the set position 41 closer to the designated region 44, using the set position 41 and the designated region 44, when the designated region 44 exists in the image 40, as shown in FIG. 3. The control unit 3 then performs guidance control of the moving body 20, based on the calculated movement direction 45. Note that, in the example of FIG. 3, the designated region 44 is in the center of the feature member image. Calculation of the movement direction 45 shown in FIG. 3 involves calculating the deviations in the X and Y-axis directions which are not shown, using the coordinates shown by the set position 41 of the image 40 and one of the coordinates included in the region shown by the designated region 44, and calculating the movement direction 45 based on the calculation result.

Next, the control unit 3, as shown in FIG. 3, generates control information for guiding the moving body 20 in the direction of the designated region 44 indicated by the movement direction 45, based on the movement direction 45, and outputs the control information to the communication unit 4.

The communication unit 4 receives a signal including the measurement distance, image and the like transmitted from the moving body 20, between the moving body guidance apparatus 1 and the moving body 20. Or else, the communication unit 4 transmits a signal including the control information and the like that are to be transmitted to the moving body 20. Note that the communication unit 4 is, for example, realized by a communication device for wireless communication.

The moving body 20 will now be described.

The moving body 20 has a position measurement unit 21, a thrust generation unit 22, an image capturing unit (image capturing apparatus) 23, a communication unit 24, and a moving body control unit 25. The case where the moving body 20 is a so-called drone such as a multicopter having a plurality of rotors will be described.

The position measurement unit 21 measures the current position (latitude and longitude) and altitude (measurement distance) of the moving body 20. The position measurement unit 21 receives a GPS (Global Positioning System) signal from a satellite, and measures the current position and altitude, based on the received GPS signal, for example. The thrust generation unit 22 has a propeller that generates thrust and an electric motor coupled to the propeller. Also, the parts of the thrust generation unit 22 are controlled by the moving body control unit 25 based on the control information.

The image capturing unit 23 is, for example, a video camera or a digital camera that captures the target member 30.

The communication unit 24 receives a signal that includes the control information and the like that are transmitted from the moving body guidance apparatus 1 or transmits a signal including the measurement distance, image and the like that are to be transmitted to the moving body guidance apparatus 1, between the moving body guidance apparatus 1 and the moving body 20. The communication unit 24 is, for example, realized by a communication device for wireless communication.

The moving body control unit 25 calculates the speed of the moving body 20, based on the current position and measurement distance measured by the position measurement unit 21. Also, the moving body control unit 25 transmits the calculated speed, the current position and measurement distance and the image to the moving body guidance apparatus 1 as state information, via the communication unit 24. Furthermore, the moving body control unit 25 controls the speed, measurement distance and direction of travel of the moving body 20, by adjusting the thrust of the thrust generation unit 22.

The target member 30 will now be described.

The target member 30 is installed at the target site where the moving body 20 will arrive. Also, the target member 30 is formed from a plurality of feature members. The target member 30, in the example embodiment, is formed using the feature members 31 (31a, 31b, 31c, 31d, 31e, 31f, 31g, 31h, 31i), as shown in FIG. 5. That is, the target member 30 is formed by arranging the feature members 31a, 31c, 31g and 31i and the feature members 31b, 31d, 31f and 31h around the feature member 31e. Specifically, the feature member 31e is arranged in the middle of the target member 30, and, the feature members 31a, 31c, 31g, and 31i are arranged in the four corners of the target member 30. Also, the feature member 31b is arranged between the feature member 31a and the feature member 31c, the feature member 31d is arranged between the feature member 31a and the feature member 31g, the feature member 31f is arranged between the feature member 31c and the feature member 31i, and the feature member 31h is arranged between the feature member 31g and the feature member 31i.

Also, with regard to the feature member 31e, in the example embodiment, feature members 32 (32a, 32b, 32c, 32d, 32e, 32f, 32g, 32h, 32i) that are smaller than the feature member 31e are arranged inside the feature member 31e, as shown in FIG. 5. Specifically, the feature members 32a, 32c, 32g, and 32i are arranged in the four corners of the target member 30. The feature member 32e is arranged in the middle of the target member 30. The feature member 32b is arranged between the feature member 32a and the feature member 32c, the feature member 32d is arranged between the feature member 32a and the feature member 32g, the feature member 32f is arranged between the feature member 32c and the feature member 32i, and the feature member 32h is arranged between the feature member 32g and the feature member 32i.

Furthermore, the feature members 31b, 31d, 31f and 31h, in the example embodiment, are black rectangular shapes, as shown in FIG. 5, and the feature members 31a, 31c, 32, 31g and 31i are rectangular shapes having black and white patterns.

Also, the feature members 31a, 31c, 32, 31g and 31i shown in FIG. 5 are formed such that, in the image 40 captured at high altitude, as shown in FIG. 2, the parts of the target member image 42 shown in FIG. 2 that correspond to the feature members 31a, 31c, 32, 31g and 31i are blurry white images due to the influence of the resolution of the image capturing unit 23. Also, the feature members 31b, 31d, 31f and 31h shown in FIG. 5 are formed such that, even in the image (target member image 42) captured at high altitude as shown in FIG. 2, the parts that correspond to the feature members 31b, 31d, 31f and 31h retain their black color.

In contrast, in the image 40 captured at low altitude, as shown in FIG. 3, the parts of the feature member image 43 shown in FIG. 3 that correspond to the feature members 31a, 31c, 32, 31g and 31i shown in FIG. 5 are formed so as to be captured more sharply than in the target member image 42, using the required number of pixels. Also, the feature members 31b, 31d, 31f and 31h shown in FIG. 5 are formed such that, even in the image 40 captured at low altitude as shown in FIG. 5, the parts of the feature member image 43 that correspond to the feature members 31b, 31d, 31f and 31h retain their black color. Note that the target member is not limited to the shape of the target member 30 shown in FIG. 5.

(Variation)

Next, in a variation, the case where the moving body 20 approaches the target member 30 and the designated region 44 is not captured in the image 40 will be described.

In the variation, the control unit 3, first, calculates the positions at which the feature members 31 and 32 are arranged in the target member 30, based on the feature member image 43 captured in the image 40, in the case where the designated region 44 is not in the acquired image 40. Next, the control unit 3 calculates the designated region 44 using the calculated positions at which the feature members 31 and 32 are arranged and the size of the feature member image 43. The size of the feature member image 43 may, for example, be the dimensions in the image, or may be represented using the number of pixels corresponding to the size. Thereafter, the control unit 3 calculates the movement direction 45 for moving the set position 41 closer to the calculated designated region 44, based on the set position 41 and the calculated designated region 44. Next, control information for guiding the moving body 20 in the direction of the target member 30 shown by the movement direction 45 is generated, based on the movement direction 45. Note that, control information is transmitted to the moving body 20 via the communication unit 4.

Figure 6:
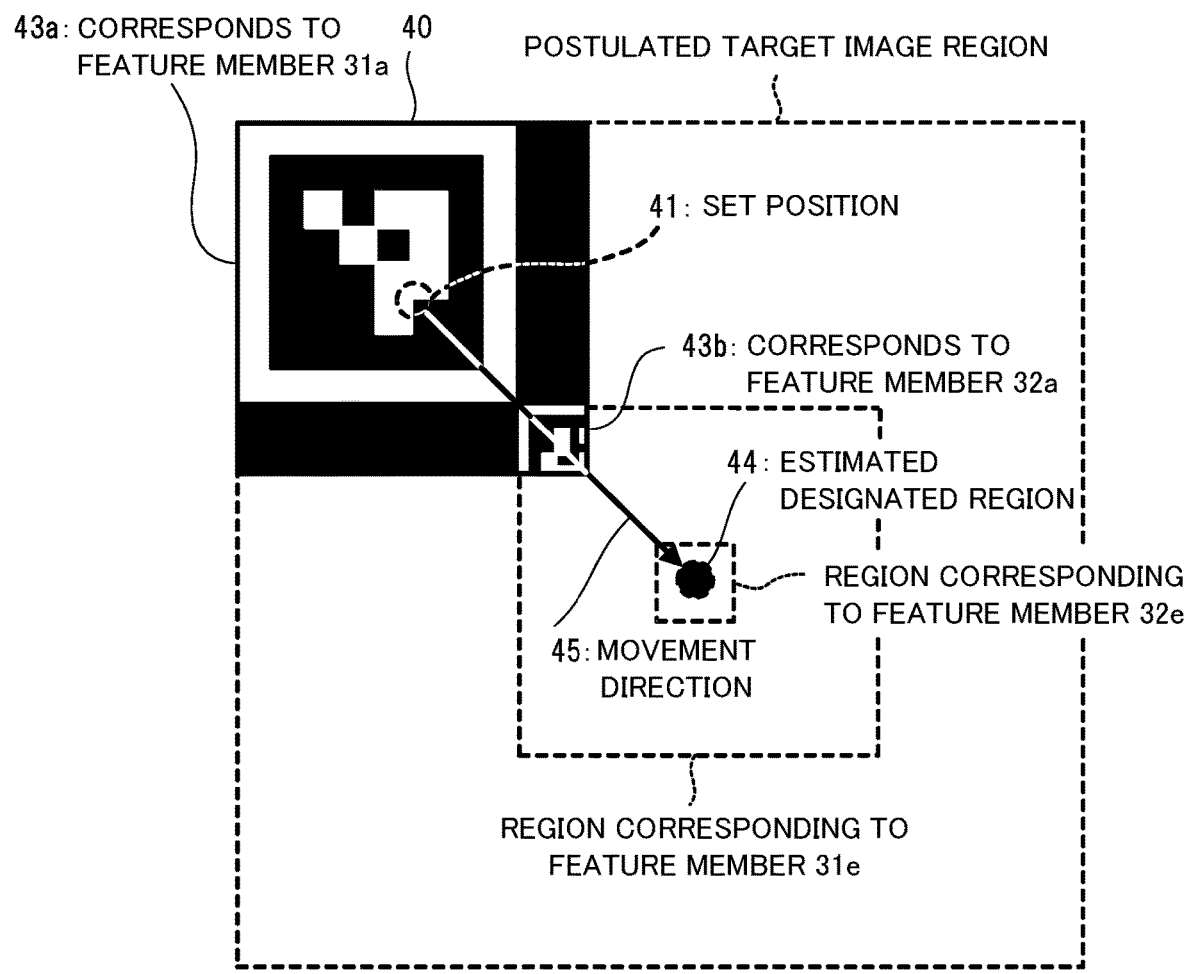
FIG. 6 is a diagram for describing calculation of the designated region and the movement direction (in the case where the designated region is not in the image).

A specific description will now be given using FIG. 6. FIG. 6 is a diagram for describing calculation of the designated region and the movement direction (in the case where the designated region is not in the image). The feature member image 43a corresponding to the feature member 31a shown in FIG. 5 and the feature member image 43b corresponding to the feature member 32a are captured in the image 40 shown in FIG. 6. The feature member image 43a is an image captured of an entirety of the feature member 31a. Also, the feature member image 43b is an image captured of a portion of the feature member 32a. Also, in the image 40 shown in FIG. 6, the set position 41 is located inside the feature member image 43a. The designated region 44 is, however, not captured in the image 40 shown in FIG. 6. Note that the designated region 44 is assumed to have been set in association with the region corresponding to the feature member 32e shown in FIG. 5.

The detection unit 2 detects the feature member image 43a and the feature member image 43b from the image 40. However, since a feature member image 43 corresponding to the feature member 32e is not captured, the detection unit 2 cannot detect the designated region 44 from the image 40.

In view of this, the control unit 3 calculates the position at which the feature member 31a is arranged in the target member 30, based on the detected feature member image 43a, in the case where the designated region 44 is not in the image 40. Specifically, the control unit 3 calculates the position of the feature member image 43a relative to the position of the feature member 32e set as the designated region 44, using arrangement information 70 shown in FIG. 7, after the feature member image 43a has been detected.

The arrangement information 70 will now be described using FIG. 7. FIG. 7 is a diagram showing an example of the data structure of the arrangement information. The information that is stored in "Feature Member Identification Number" shown in FIG. 7 is identification information indicating the feature members 31 (31a, 31c, 31g, 31i) and 32 (32a, 32c, 32e, 32g, 32i) to which identification numbers (ID1 to ID9) shown in FIG. 5 are given. The information that is stored in "Arrangement relative to Specific Region" is information indicating the arrangement of the feature members 31 and 32 to which the identification numbers are given relative to the position of the feature member 32e shown in FIG. 5. That is, this information indicates the direction in which the feature members 31 and 32 to which the identification numbers are given are arranged relative to the feature member 32e.

Next, the control unit 3 estimates the position of the designated region 44 which is outside the image 40, using the calculated position and the size of the feature member image 43a on the image 40. Specifically, in the estimation of the position of the designated region 44 shown in FIG. 6, the dimensions of the parts respectively forming the target member 30 and the feature members 31 and 32 shown in FIG. 5 are represented with ratios, and the ratios are stored in a storage unit that is provided in the moving body guidance apparatus 1 or the like. The control unit 3 then uses the stored ratios to estimate the position of the feature member 32e in which the designated region 44, which is in the abovementioned direction, is set, based on the size of the feature member image 43a.

Next, the control unit 3 calculates the movement direction 45 for moving the set position 41 closer to the calculated designated region 44. Specifically, in the calculation of the movement direction 45 shown in FIG. 6, the control unit 3 calculates the deviations in the X and Y-axis directions which are not shown, using the coordinates shown by the set position 41 of the image 40 and one of the coordinates included in the region shown by the estimated designated region 44, and calculates the movement direction 45 based on the calculation result.

In this way, according to the variation, the designated region 44 can be estimated from the captured image 40, in the case where the moving body 20 approaches the target member 30 and the designated region 44 is not captured in the image 40, thus enabling control for moving the set position 41 indicating the position of the moving body 20 closer to the designated region 44 to be performed. As a result, the moving body 20 can be accurately guided to a target site where the target member 30 is installed.

[Apparatus Operations]

Figure 8:
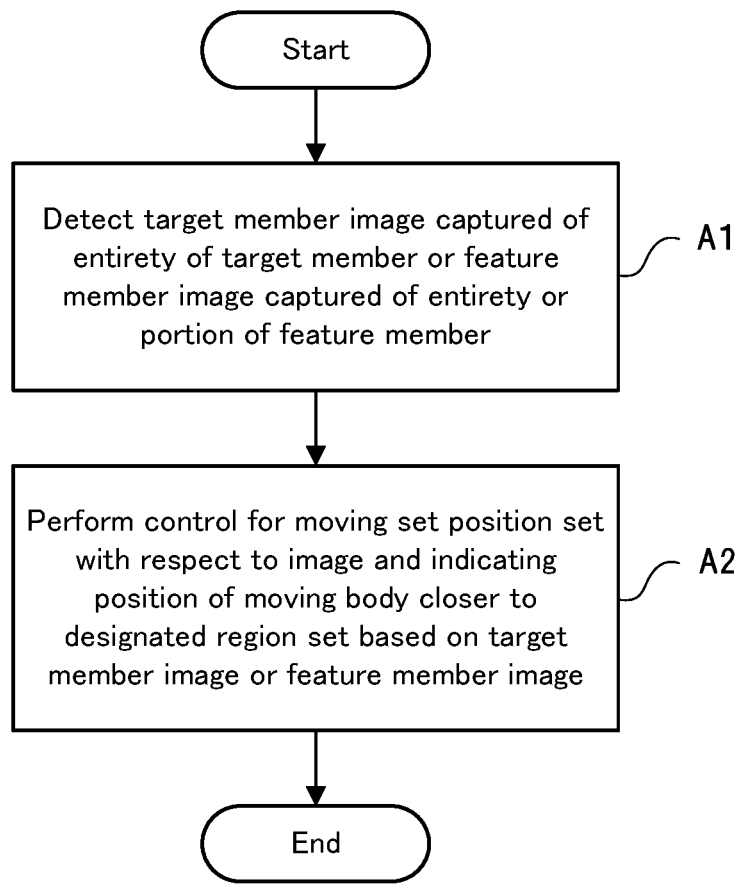
FIG. 8 is a diagram showing operations of the moving body guidance apparatus.

Next, operations of the moving body guidance apparatus 1 in the example embodiment and variation of the present invention will be described using FIGS. 8 and 9. FIG. 8 is a diagram showing operations of the moving body guidance apparatus 1. In the following description, FIGS. 2 to 7 will be taken into consideration as appropriate. Also, in the example embodiment and variation, the moving body guidance method is implemented by operating the moving body guidance apparatus 1.

Therefore, the following description of the operations of the moving body guidance apparatus 1 will be given in place of a description of the moving body guidance method in the example embodiment and variation.

First, the overall operations of the moving body guidance apparatus 1 will be described using FIG. 8. As shown in FIG. 8, the moving body guidance apparatus 1 detects the target member image 42 captured of an entirety of the target member 30 or the feature member image 43 captured of an entirety or a portion of the feature members 31 and 32 from the image 40 captured by the image capturing unit 23 mounted on the moving body 20 (step A1). Next, the moving body guidance apparatus 1 performs control for moving the set position 41 indicating the position of the moving body 20 set with respect to the image 40 closer to the target member image 42 or closer to the designated region 44 set based on the feature member image 43 (step A2).

Next, the processing (steps A1, A2) in the detection unit 2 and the control unit 3 shown in FIGS. 1 and 4 will be described in detail using FIG. 9. FIG. 9 is a diagram showing an example of detailed operations of the moving body guidance apparatus.

In step A11, the detection unit 2 acquires the measurement distance and the image 40 captured by the image capturing unit 23 from the moving body 20. Specifically, first, the moving body control unit 25 that is mounted in the moving body 20 acquires the measurement distance measured by the position measurement unit 21 and the image captured by the image capturing unit 23, and transmits information including the measurement distance and the image to the moving body guidance apparatus 1 via the communication unit 24. In the moving body guidance apparatus 1, the communication unit 4 receives the information including the measurement distance and image, and the detection unit 2 acquires the received measurement distance and image.

In step A12, the detection unit 2 detects the target member image 42 or the feature member image 43 from the image 40. Specifically, the detection unit 2 refers to the abovementioned image detection information, using the acquired image 40 and measurement distance, and detects the target member image 42 that depends on the measurement distance or the feature member image 43 respectively captured of an entirety or a portion of the feature members 31 and 32 forming the target member 30 from the acquired image 40.

In step A13, the detection unit 2 detects whether the designated region 44 is in the image 40. Specifically, the detection unit 2 determines whether the feature members 31 and 32 corresponding to the feature member image 43 are set as the designated region 44, in the case where the feature member image 43 is detected from the image 40. If the detected feature member image 43 is not set as the designated region 44 (step A13: Yes), in step A14, the control unit 3 estimates the designated region. If the detected feature member image 43 is set as the designated region 44 (step A13: No), the control unit 3, in step A15, estimates the movement direction 45.

In step A14, the control unit 3 estimates the designated region 44, in the case where the designated region 44 is not in the acquired image 40. Specifically, as shown in the variation, the control unit 3 calculates the position, in the target member 30, of the feature member 31 or 32 set as the designated region 44, using the arrangement information 70, after the feature member image 43 has been detected. Next, the control unit 3 estimates the position of the designated region 44 which is outside the image 40, using the calculated position and the size of the feature member image 43a on the image 40.

In step A15, the control unit 3 calculates the movement direction 45. Specifically, the control unit 3 calculates the deviations in the X and Y-axis directions, using the coordinates shown by the set position 41 of the image 40 and one of the coordinates included in the region shown by the designated region 44, and calculates the movement direction 45 based on the calculation result.

In step A16, the control unit 3 moves the set position 41 closer to the target member image 42 or the designated region 44. Specifically, the control unit 3 generates control information for performing guidance of the moving body 20 in the direction indicated by the movement direction 45 and guidance for closing the distance between the moving body 20 and the target member 30, and, outputs the control information to the communication unit 4.

In step A17, the control unit 3 determines whether the moving body 20 has arrived at the target site. Specifically, if the moving body 20 has arrived at the target site (step A17: Yes), the control unit 3 ends guidance control. If the moving body 20 has not arrived at the target site (step A17: No), the control unit 3 continues guidance control.

Effects of the Example Embodiment

As described above, according to the example embodiment, the moving body guidance apparatus 1 performs control for moving the set position 41 set with respect to the captured image 40 and indicating the position of the moving body 20 closer to the target member image 42 or closer to the designated region 44 set based on the feature member image 43. As a result, the moving body 20 can be accurately guided to the target site where the target member 30 is installed.

Note that the detection unit 2 and the control unit 3 may be provided in the moving body control unit 25 of the moving body 20. As a result, it is possible for the moving body 20 to arrive to the target site by itself

[Program]

Figure 9:
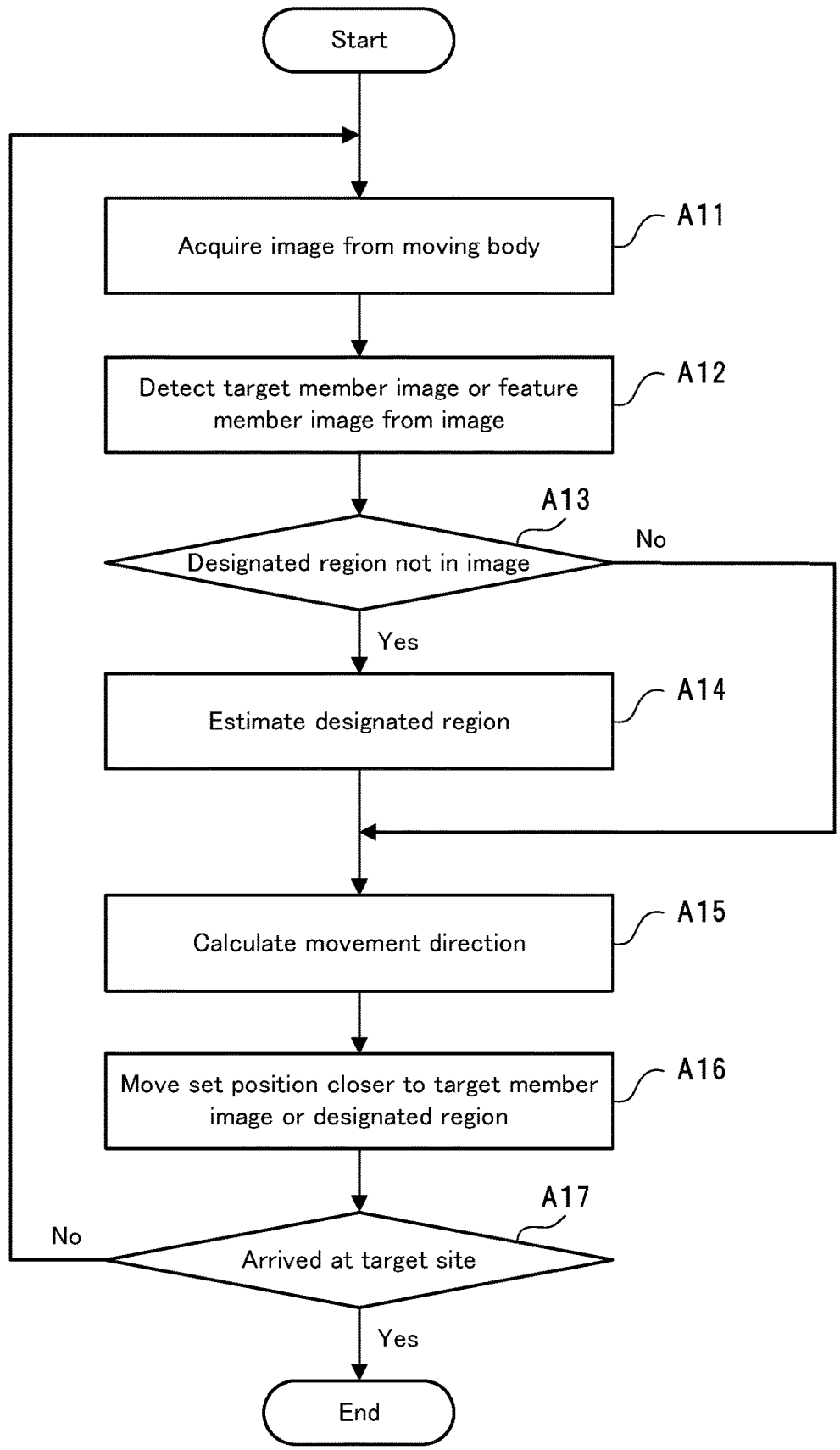
FIG. 9 is a diagram showing an example of detailed operations of the moving body guidance apparatus.

A program in the example embodiment of the present invention need only be a program that causes a computer to execute steps A1 and A2 shown in FIG. 8 or steps A11 to A17 shown in FIG. 9. The moving body guidance apparatus 1 and the moving body guidance method in the example embodiment can be realized, by this program being installed on a computer and executed. In this case, a processor of the computer performs processing while functioning as the detection unit 2 and the control unit 3.

Also, the program in the example embodiment may be executed by a computer system built from a plurality of computers. In this case, the computers may each function as one of the detection unit 2 and the control unit 3.

[Physical Configuration]

Figure 10:
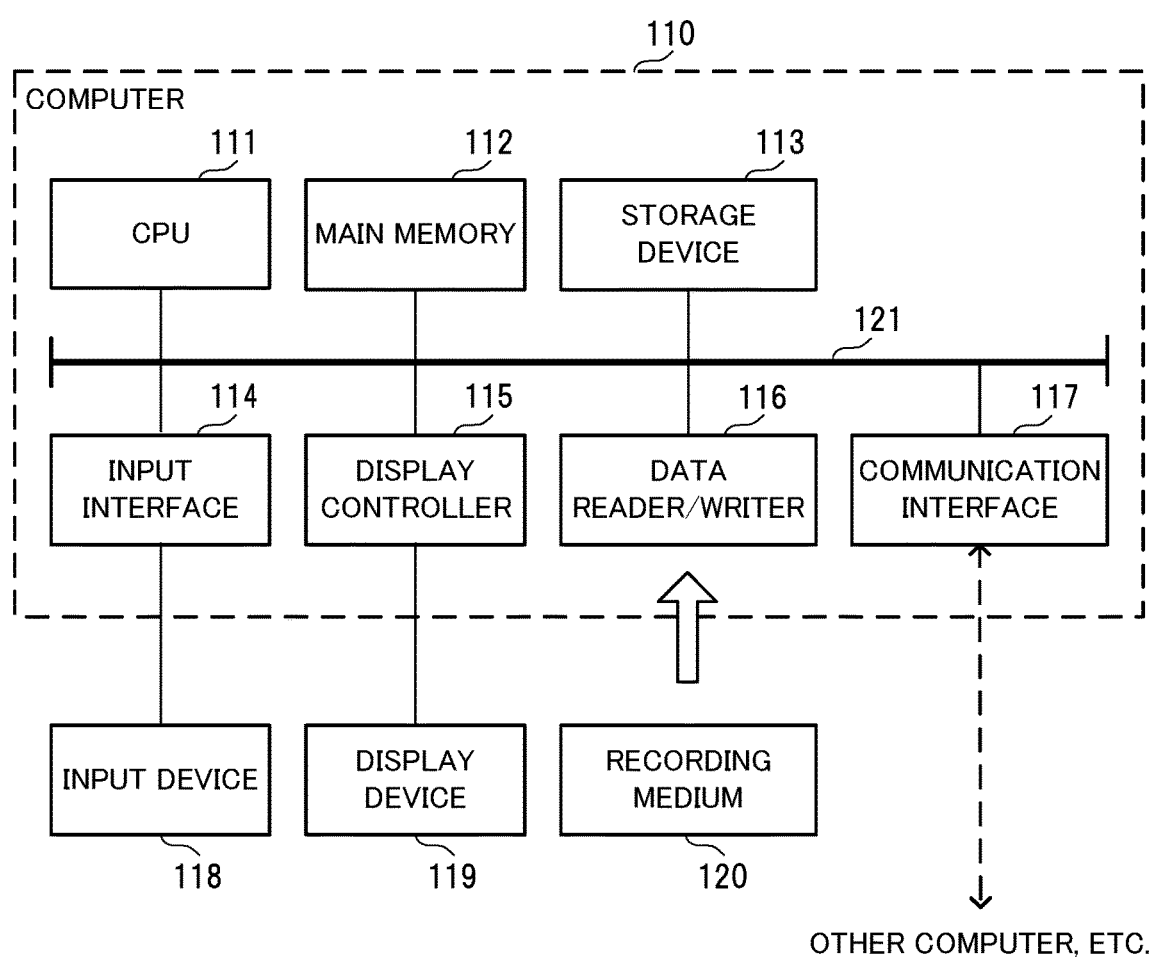
FIG. 10 is a diagram showing an example of a computer that realizes the moving body guidance apparatus.

Here, a computer that realizes the moving body guidance apparatus 1 by executing a program of the example embodiment will be described using FIG. 10. FIG. 10 is a block diagram showing an example of a computer that realizes the moving body guidance apparatus 1 in the example embodiment of the present invention.

As shown in FIG. 10, a computer 110 includes a CPU 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting programs (code) in the example embodiment that are stored in the storage device 113 to the main memory 112, and executing these programs in predetermined order. The main memory 112, typically, is a volatile storage device such as a DRAM (Dynamic Random Access Memory). Also, programs in the example embodiment are provided in a state of being stored in a computer-readable recording medium 120. Note that programs in the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display on the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

[Supplementary Notes]

The following supplementary notes are further disclosed in relation to the above example embodiment. Note that the example embodiment described above can be partially or wholly realized by supplementary notes 1 to 9 described below, although the present invention is not limited to the following description.

(Supplementary Note 1)

A moving body guidance apparatus including:

a detection unit configured to detect, from an image captured by an image capturing apparatus mounted on a moving body, a target member image captured of an entirety of a target member or a feature member image captured of an entirety or a portion of a feature member forming the target member; and a control unit configured to perform guidance control for moving a set position set with respect to the image and indicating a position of the moving body closer to the target member image or closer to a designated region set based on the feature member image.

(Supplementary Note 2)

The moving body guidance apparatus according to supplementary note 1, in which the control unit, in a case where an image captured of the entirety of the target member is acquired, calculates a movement direction for moving the set position closer to the target member image, using the set position and the target member image.

(Supplementary Note 3)

The moving body guidance apparatus according to supplementary note 2, in which the control unit, in a case where the designated region is not in the acquired image, calculates a position at which the feature member is arranged in the target member, based on the feature member image captured in the image, calculates the designated region using the calculated position and a size of the feature member image, and calculates a movement direction for moving the set position closer to the calculated designated region.

(Supplementary Note 4)

A moving body guidance method including:

(A) a step of detecting, from an image captured by an image capturing apparatus mounted on a moving body, a target member image captured of an entirety of a target member or a feature member image captured of an entirety or a portion of a feature member forming the target member; and (B) a step of performing guidance control for moving a set position set with respect to the image and indicating a position of the moving body closer to the target member image or closer to a designated region set based on the feature member image.

(Supplementary Note 5)

The moving body guidance method according to supplementary note 4, in which in the (B) step, in a case where an image captured of the entirety of the target member is acquired, a movement direction for moving the set position closer to the target member image is calculated, using the set position and the target member image.

(Supplementary Note 6)

The moving body guidance method according to supplementary note 5, in which in the (B) step, in a case where the designated region is not in the acquired image, a position at which the feature member is arranged in the target member is calculated, based on the feature member image captured in the image, the designated region is calculated using the calculated position and a size of the feature member image, and a movement direction for moving the set position closer to the calculated designated region is calculated.

(Supplementary Note 7)

A computer-readable recording medium according to an example aspect of the present invention includes a moving body guidance program recorded thereon, the program including instructions that cause a computer to carry out:
- (A) a step of detecting, from an image captured by an image capturing apparatus mounted on a moving body, a target member image captured of an entirety of a target member or a feature member image captured of an entirety or a portion of a feature member forming the target member; and
- (B) a step of performing guidance control for moving a set position set with respect to the image and indicating a position of the moving body closer to the target member image or closer to a designated region set based on the feature member image.

(Supplementary Note 8)

The computer-readable recording medium according to supplementary note 7, in which
in the (B) step, in a case where an image captured of the entirety of the target member is acquired, a movement direction for moving the set position closer to the target member image is calculated, using the set position and the target member image.

(Supplementary Note 9)

The computer-readable recording medium according to supplementary note 8, in which
in the (B) step, in a case where the designated region is not in the acquired image, a position at which the feature member is arranged in the target member is calculated, based on the feature member image captured in the image, the designated region is calculated using the calculated position and a size of the feature member image, and a movement direction for moving the set position closer to the calculated designated region is calculated.

Although the present invention of the present application has been described above with reference to an example embodiment, the present invention is not limited to the foregoing example embodiment. Various modifications apparent to those skilled in the art can be made to the configurations and details of the present invention of the present application within the scope of the present invention.

INDUSTRIAL APPLICABILITY

As described above, according to the present invention, a moving body can be accurately guided to a target site. The present invention is useful in fields for guiding a moving body to a target site.

LIST OF REFERENCE SIGNS

1 Moving body guidance system
2 Detection unit
3 Control unit
4 Communication unit
20 Moving body
21 Position measurement unit
22 Thrust generation unit
23 Image capturing unit
24 Communication unit
25 Moving body control unit
30 Target member
31, 32 Feature member
40 Image
41 Set position
42 Target member image
43 Feature member image
44 Specific region
45 Movement direction
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A moving body guidance apparatus comprising:
a processor; and
a memory storing executable instructions that, when executed by the processor, causes the processor to perform as:
a detection unit configured to detect, from an image captured by an image capturing apparatus mounted on a moving body, a target member image captured of an entirety of a target member or a feature member image captured of an entirety or a portion of a feature member forming the target member;
and a control unit configured to perform guidance control for moving a set position set with respect to the image and indicating a position of the moving body closer to the target member image or closer to a designated region set based on the feature member image, wherein
the control unit, in a case where the designated region is not in the image, designates a first feature member image captured in the image,
obtains a position of the first feature member image with respect to a second feature member image in which the designated region is set, by referring to arrangement information stored in a storage unit in advance,
estimates a position of a second feature member using ratios of dimensions of parts respectively forming the target member and a first feature member and the second feature member stored in advance in the storage unit, based on a size of the first feature member image, and calculates a movement direction for moving the set position closer to the designated region.

2. The moving body guidance apparatus according to claim 1, wherein
the control unit, in a case where the image captured of the entirety of the target member is acquired, calculates a movement direction for moving the set position closer to the target member image, using the set position and the target member image.

3. A moving body guidance method comprising:
detecting, from an image captured by an image capturing apparatus mounted on a moving body, a target member image captured of an entirety of a target member or a feature member image captured of an entirety or a portion of a feature member forming the target member; and
performing guidance control for moving a set position set with respect to the image and indicating a position of the moving body closer to the target member image or closer to a designated region set based on the feature member image, based on determining the designated region is not in the image, designating a first feature member image captured in the image, obtaining a position of the first feature member image with respect to a second feature member image in which the designated region is set, by referring to arrangement information stored in a storage unit in advance, estimating a position of a second feature member using ratios of dimensions of parts respectively forming the target member and a first feature member and the second feature member stored in advance in the storage unit, based on a size of the first feature member image, and calculating a movement direction for moving the set position closer to the designated region.

4. The moving body guidance method according to claim 3, wherein in a case where the image captured of the entirety of the target member is acquired, a movement direction for moving the set position closer to the target member image is calculated, using the set position and the target member image.

5. A non-transitory computer-readable recording medium that includes a moving body guidance program recorded thereon, the program including instructions that cause a computer to carry out:

detecting from an image captured by an image capturing apparatus mounted on a moving body, a target member image captured of an entirety of a target member or a feature member image captured of an entirety or a portion of a feature member forming the target member; and performing guidance control for moving a set position set with respect to the image and indicating a position of the moving body closer to the target member image or closer to a designated region set based on the feature member image; and in a case where the designated region is not in the image, designating a first feature member image captured in the image, obtaining a position of the first feature member image with respect to a second feature member image in which the designated region is set, by referring to arrangement information stored in a storage unit in advance, estimating a position of a second feature member using ratios of dimensions of parts respectively forming the target member and a first feature member and the second feature member stored in advance in the storage unit, based on a size of the first feature member image, and calculating a movement direction for moving the set position closer to the designated region.

6. The non-transitory computer-readable recording medium according to claim 5, wherein in a case where the image captured of the entirety of the target member is acquired, a movement direction for moving the set position closer to the target member image is calculated, using the set position and the target member image.

\* \* \* \* \*